2,847,824

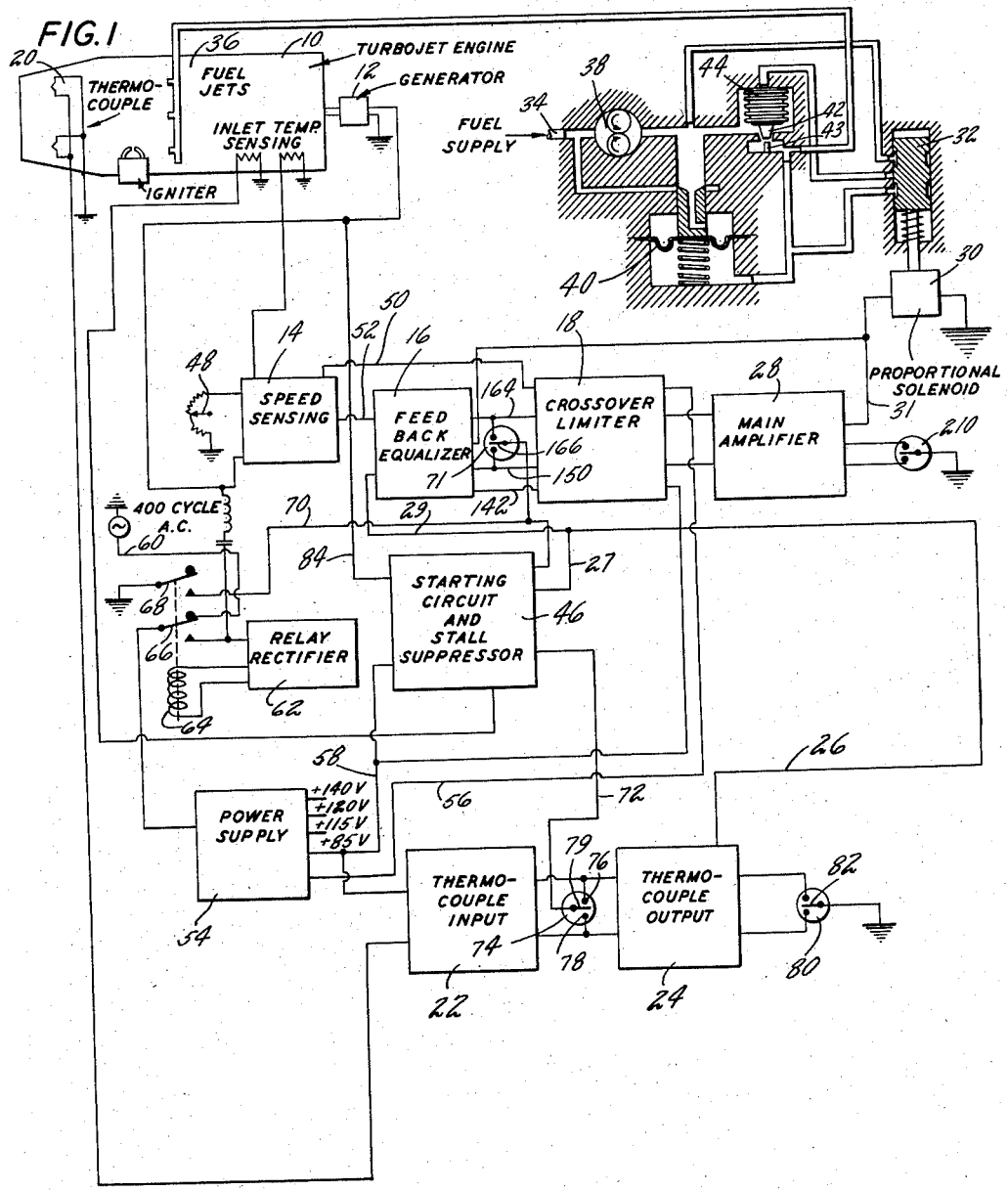
Aug. 19, 1958 — S. G. BEST ET AL — 2,847,824
STARTING CIRCUIT FOR ELECTRONIC JET FUEL CONTROL
Filed April 14, 1952
INVENTORS
STANLEY G. BEST
THOMAS P. FARKAS
ATTORNEY Aug. 19, 1958 S. G. BEST ET AL 2,847,824
STARTING CIRCUIT FOR ELECTRONIC JET FUEL CONTROL
Filed April 14, 1952 2 Sheets-Sheet 2
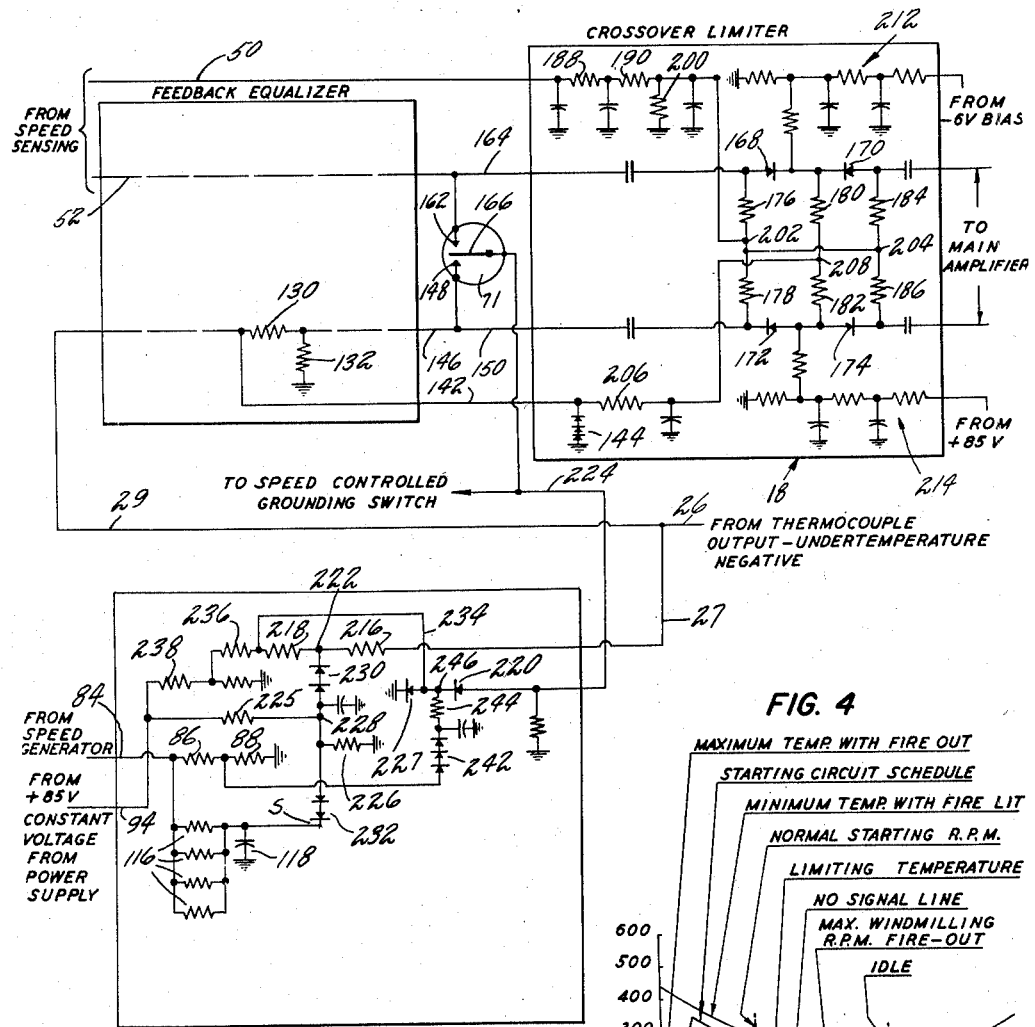
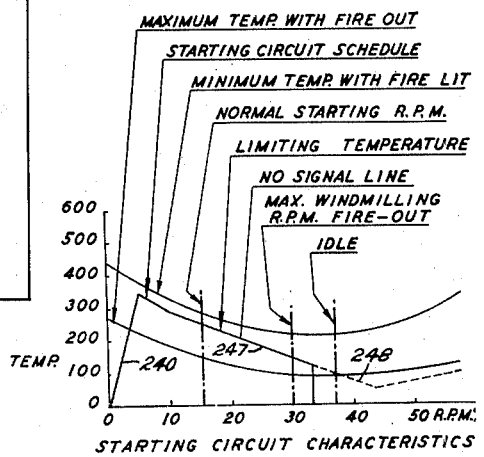
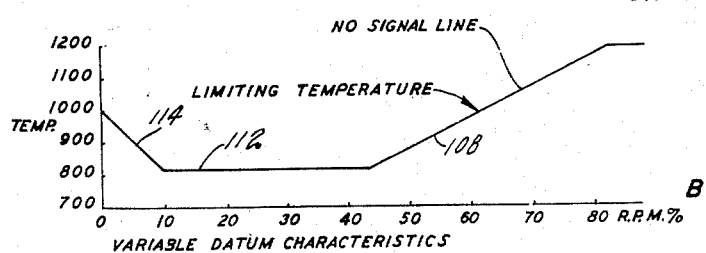
INVENTORS
STANLEY G. BEST
THOMAS P. FARKAS
BY Harris & Lucker
ATTORNEY United States Patent Office 2,847,824
Patented Aug. 19, 1958

STARTING CIRCUIT FOR ELECTRONIC JET FUEL CONTROL

Stanley G. Best, Manchester, and Thomas P. Farkas, Bloomfield, Conn., assignors to United Aircraft Corporation, East Hartford, Conn., a corporation of Delaware Application April 14, 1952, Serial No. 282,204

23 Claims. (Cl. 60—39.14)

This invention relates to fuel control mechanism and particularly to mechanism for controlling the flow of fuel to a turbine during starting of said turbine.

An object of the invention is to limit the supply of fuel during starting to thereby avoid an accumulation thereof in the turbine before ignition takes place.

A further object is to automatically increase the fuel flow after ignition.

A further object is the provision of mechanism for automatically increasing the fuel flow when a predetermined turbine speed or temperature is exceeded during starting.

A still further object is mechanism which will maintain fuel flow at a predetermined minimum during starting and will automatically render the fuel flow subject to control by selected turbine parameters after starting.

A still further object is the provision of mechanism which will utilize existing under temperature indications to provide a decrease fuel signal during starting and an increase fuel signal after starting.

Still another object is the modification of an electronic fuel control normally limiting fuel only in response to over speed and over temperature signals, for limiting fuel in response to under temperature signals during starting.

Additional objects and advantages will be apparent from the attached specification, claims and drawings in which:

Fig. 1 is a schematic and block diagram showing the general arrangement of the turbine, the fuel supply, and the electronic control for the fuel supply.

Fig. 2 shows the feedback equalizer, the crossover limiter and the stall suppressor schematically in more detail than Fig. 1, including the wiring diagrams therefor.

Fig. 3 is a curve of temperature against speed showing the no signal line of the corrected temperature signal in which a variable datum is used.

Fig. 4 is a curve of temperature against speed showing the nature of a no signal condition for the starting circuit.

Referring to the drawings and particularly to Fig. 1, the turbo-jet engine 10 may be of any well known type such as the type utilizing a compressor receiving air from an air inlet and delivering air under pressure to a combustion chamber where fuel is burned. The products of combustion from the combustion chamber are fed to a gas turbine which drives the compressor. Gas exhausted from the turbine passes out through a tailpipe. The compressor may be either centrifugal or axial flow type and the turbine may be either a power jet type or a portion of the turbine power may be utilized to drive a propeller giving a combination known as a turbo-prop.

During operation of the turbo-jet type in particular, the fuel is selectively controlled by a speed or a temperature sensitive control system. During starting of the engine when the fuel is turned on, the engine being both under speed and under temperature, the control system will call for maximum fuel which, unless ignition takes place at once, may deposit so much fuel in the combustion chamber that when ignition does take place, the excessive amount of fuel trying to burn all at once will create what is known as a "hot start," which may overheat and damage the turbine.

In order to prevent or limit such "hot starting," we have invented a starting circuit which may be applied to an electronic fuel control system so that the under speed and under temperature signals existing during the starting operation before ignition will be utilized to call for a minimum fuel flow instead of a maximum fuel flow until after ignition takes place. After ignition these same signals will be utilized to call for maximum fuel flow in order to get as rapid acceleration to the selected speed as possible.

The electronic control in general is similar to that shown in Offner application Serial No. 84,696 filed March 31, 1949, now Patent No. 2,697,908, issued December 28, 1954, entitled System of Engine Speed Control. As shown in Fig. 1, of the present application, a speed signal is taken from a generator 12, which may be an alternating current generator driven by the turbine, and is fed to a speed sensing circuit 14. In the speed sensing circuit, a speed error voltage is produced. This error voltage may be zero when the turbine is on speed, positive when the turbine is over speed, and negative when the turbine is under speed. The speed error signal is fed to crossover limiter 18.

A temperature signal is fed from tailpipe thermocouples 20 to thermocouple input circuit 22 where it is compared with a fixed voltage and transformed into a temperature error signal. The temperature error signal is amplified in the thermocouple output circuit 24 and fed through line 26 to feedback equalizer 16 and crossover limiter 18. The amplified temperature error signal is zero or null when on temperature, positive when the turbine is over temperature and negative when the turbine is under temperature. In the crossover limiter 18, the most positive or least negative signal of the speed and temperature signals is selected to be transmitted to the main amplifier 28 where it is amplified and then fed to the proportional solenoid 30 through the line 31.

The proportional solenoid is of a type shown in Patent No. 2,579,723, issued December 25, 1951, to S. G. Best for Magnetic Device, to which reference may be made for a more detailed explanation. The proportional solenoid 30, which is normally centered but may be moved in one direction with a negative signal and in the opposite direction with a positive signal, operates a valve 32 controlling the flow of fuel from the fuel supply 34 to the fuel jets 36. This fuel supply system is of the type shown in application Serial No. 231,926 filed June 16, 1951, by D. R. Pearl and S. G. Best, now Patent No. 2,796,733, issued June 25, 1957, for Fuel Control System for Turbine Engine, to which reference may be made for more detailed explanation and generally includes a fuel pump 38 for supplying fuel under pressure with a pressure actuated relief valve 40 for maintaining the pressure drop the same across the throttle valve 42. Valve 32 directs either the high or low pressure to the interior of bellows 44 to move valve 42 toward closed or opened position to thereby regulate the flow of fuel to the fuel jets 36. The movement of the valve toward closed position may be limited by a stop such as 43 to provide a minimum fuel flow.

The starting circuit of this invention modifies only the action of the crossover limiter 18. The speed sensing circuit 14 utilizes a bridge circuit to match a constant voltage selected by the pilot's lever 48 against a speed signal generator 12, the resulting signal is rectified to give a speed error signal which is applied to lines 50 and 52.

Power for operating the various electronic elements is normally provided by the generator 12 operating through a usual power supply 54, supplying among other voltages a minus 6 volt bias in line 56 and a plus 85 volt voltage-regulator-tube-controlled voltage in line 58. During the starting cycle, however, 400 cycle A. C. voltage from an outside source is supplied through the line 60 to the power supply. When a preselected speed is reached by the turbine and accordingly by the generator 12, the generator voltage acting through relay rectifier 62 and relay coil 64 will actuate switch arm 66 to disconnect the 400 cycle source and connect in the generator 12 to the power supply. A second switch arm 68 is actuated by the coil 64 at the same time in order to ground out line 70 to connect the swinger of chopper 71 to ground and disable the starting circuit in a manner to be later described. The thermocouple output and the main amplifiers are in effect D. C. chopper amplifiers of a well known type.

The thermocouple input and chopper 74 balance the thermocouple signal against a datum which may be fixed or may be varied along a curve of which Fig. 3 is an example. The temperature signal may be compensated for thermocouple lag in a manner which does not affect the starting circuit and need not be described in detail here.

In the structure shown the controlling error signal utilized by the starting circuit to control the fuel flow during starting is the temperature signal originating with the thermocouples 20 and emerging from the thermocouple outlet 24 amplified and modified to become a temperature error signal and led through lines 26 and 27 to the starting circuit and through line 29 to feedback equalizer 16 and crossover limiter 18.

In general, the variable datum used in determining the temperature error is a signal varying with speed and which is positive below 82% R. P. M. This positive signal is fed through the swinger 79 of chopper 74 and modifies the amplitude of the square wave produced by chopper 74. The correction voltage or temperature error signal supplied by the thermocouple to the chopper contacts 76 and 78 is positive for an under temperature condition and negative for an over temperature condition. If the positive voltage supplied to arm 79 and the positive voltages at 76 and 78 are equal there would of course be no amplitude on the square wave and no correction signal would be supplied to line 26. Hence the positive signal from the variable datum will in effect reduce the under temperature error signal of the thermocouple input and balance the signal at zero at a lower temperature. Stated in another way swinger arm 82 of chopper 80 is mechanically synchronized with chopper arm 79 in such a way that signals at 76 and 78, more positive than those in the swinger arm 79, will produce negative (i. e. under temperature) voltage in the line 26, while voltages in the contacts 76 and 78, more negative (less positive) than those in the swinger arm 79, will produce positive (i. e. over temperature) voltages in the line 26.

The convention observed with respect to the illustration of rectifiers herein is that current flow (from plus to minus), as distinct from electron flow, is in the direction of the arrow.

Fig. 3 indicates the tailpipe temperatures at which the signal in line 26 from the thermocouple output will be zero. Tailpipe temperatures below those indicated on this figure will give a negative signal and it is this negative signal which is utilized in the starting circuit to eventually produce a signal in the proportional solenoid which will move the throttle valve to a minimum fuel position.

The temperature error signal on line 26 is led through line 29 to resistors 130 and 132 to form a voltage divider circuit. A portion of the temperature error signal is led off through line 142 to the crossover limiter for switching purposes, which will be explained later. In the crossover limiter, rectifier 144 connects line 142 with ground and limits any negative temperature error voltage appearing on line 142 to a small amount, approximately one volt. A portion of the temperature error signal is led off from a point between resistors 130 and 132 through line 146 to contact 148 of the chopper 71 and is also led through line 150 into the crossover limiter from which it is selectively fed to the proportional solenoid in a manner to be described later.

The speed error signal is fed through line 52 to the contact 162 of chopper 71. This speed error signal is led on line 164 into the crossover limiter from which it is selectively fed to the proportional solenoid in a manner to be described later. The speed error signal, applied to line 50 from the speed sensing circuit, is fed into the crossover limiter for switching purposes which will be described later.

The speed and temperature error signals fed through lines 164 and 150 into the crossover limiter are led to rectifiers which will select one or the other as the signal to be transmitted to the main amplifier and thence to the proportional solenoid. The speed error signal on line 164 is a square wave and is led to rectifiers 168 and 170 and the temperature error signal on line 150 is also a square wave and is led to rectifiers 172 and 174.

The speed error signal is also fed into the crossover limiter through line 50 and is led through resistors 188, 190 and 200, the condensers in the lines serving as filters. The speed error voltage existing between the resistors 190 and 200 is applied at 202 between resistors 176 and 178 and at 204 between 184 and 186. This is a rectified D. C. error signal and is used to bias rectifiers 168, 170, 172 and 174. In the same manner the D. C. temperature error signal is led in on line 142 and after passing through resistor 206 is applied at 208 between resistors 180 and 182 which are connected to the rectifiers 168, 170, 172 and 174 to bias them. It will now be apparent that if the voltage in the speed error signal at 202 and 204 is more positive than the voltage in the temperature error signal at 208, rectifiers 168 and 170 will be biased to conduction and rectifiers 172 and 174 will be biased to non-conduction. Rectifiers 168 and 170 being conductive will pass the speed error square wave produced by chopper 71 and fed in line 164 to the crossover limiter.

Conversely, if the temperature error signal fed into point 208 is more positive than the speed error signal fed into points 202 and 204, then rectifiers 172 and 174 will be biased to conduction and rectifiers 168 and 170 will be biased to non-conduction. The temperature error square wave fed in through line 150 will then be able to pass through rectifiers 172 and 174 to the proportional solenoid while the speed error signal becomes blocked. It is thus apparent that the most positive or the least negative error signal of the speed or temperature will select its corresponding square wave as the signal to be transmitted, amplified and fed to the proportional solenoid.

The speed and temperature error signals are arranged so that when fed to the crossover limiter an over speed or over temperature condition is indicated by a positive signal and conversely an under temperature or under speed signal is negative. In order to actuate the proportional solenoid 30 to close the throttle valve 42 to the minimum fuel position, it will, therefore, be necessary to feed a positive signal into the crossover limiter. This will call for less fuel in order to overcome an over speed or over temperature condition and thus close the valve. If the closing action is continued long enough, the valve will, of course, arrive at the minimum fuel position.

During starting, the temperature and the speed are both low and the corresponding signals are, therefore, under speed and under temperature signals which appear as negative signals at the crossover limiter. It is the purpose of the starting circuit to so modify these, and particularly the temperature signal, as to make this negative signal appear as a positive signal to the proportional solenoid. This is done by applying a negative signal to the swinger arm 166 which signal is more negative than the signal appearing on contact 148 and because of the chopper action of synchronized choppers 71 and 210 the output of the main amplifier will be the same as if a positive signal were applied to contacts 162 or 148. This action is similar to that explained in connection with synchronized choppers 74 and 80 in the thermocouple output circuit and it is believed will need no further explanation here. Usually, during starting the speed error signal will be quite negative but the negative temperature error signal is limited by the rectifier 144 and hence during starting in the structure shown, it will be the least negative of the two negative signals and will select the chopped temperature error signal as the one to be transmitted. It should be understood, however, that if desired the circuits can be constructed so that for a portion or all of the starting period, the speed error signal would be the least negative of the two negative signals and would select the chopped speed error signal as the one to be transmitted.

After a selected speed, about 33% R. P. M., has been reached, the generator 12 will produce sufficient voltage to actuate relay 64 and the switch arms 66 and 68 associated therewith. This will disconnect the 400 cycle A. C. source from the power supply and connect the generator to the power supply. This switching action will also connect the swinger arm 166 with ground so that no further bias will be applied from the starting circuit to the arm 166 and the fuel control will be immediately transferred to the control of the temperature error signal which will now call for maximum fuel flow limited only by the maximum permissible temperature in order to provide the most rapid acceleration.

The network shown generally at 212 is fed from the minus 6 volt bias line of the power supply and is used to slightly bias rectifiers 168 and 170 to avoid the deadband common to all rectifiers. In a similar way the network shown generally at 214 is fed from the plus 85 volt section of the power supply to provide a bias for rectifiers 172 and 174 to avoid the deadband.

In order to provide a negative signal to apply to the swinger arm 166 to so shape the square wave produced by the chopper 71 as to give an effect of a positive signal from the two negative signals at 166 and 148, the under temperature negative signal from the thermocouple is led in on lines 26 and 27 to the starting circuit. This negative signal is led through resistors 216 and 218 through a rectifier 220 and through line 224 to the swinger 166. The signal coming in on line 26 for any one temperature has a value which will vary in accordance with the curve of Fig. 3 and for slow speeds after passing through resistors 216 is met at point 222 by a positive voltage which will reduce its value. The positive voltage at 222 at zero speed is the voltage produced from a constant 85 volt source passing through resistors 225 and 226 and at zero speed will completely counteract the negative signal from the thermocouple output and because of rectifiers 220 and 227 give zero voltage in line 224. It will be apparent that as long as the voltage at point 228 is greater than that at 222, rectifier 230 will conduct and neutralize any negative voltage existing at 222. As the speed increases the alternating voltage from the speed generator appearing at S will increase and passing through the rectifier 232 will tend to make the voltage at 228 more negative than at 222 and stop rectifier 230 from conducting. This build up of voltage takes place so rapidly that when the speed reaches 5% R. P. M., rectifier 230 is completely blocked and the full strength of the negative signal from the thermocouple may then pass through resistor 218, line 234 and rectifier 220. This voltage is attenuated a fixed amount by being connected through resistors 236 and 238 with the constant voltage source at line 94. The curve in Fig. 4 which shows the starting circuit characteristics indicates temperatures below which the signal appearing at the proportional solenoid will be negative and call for a minimum fuel flow and above which the signal at the proportional solenoid will be positive and call for normal control. The portion 240 of the curve shown in Fig. 4 corresponds to the voltage difference between arm 166 and contact 148 up to a speed of 5% R. P. M. The alternating current from the speed generator 12 is also fed through line 84 to rectifier 242 and resistor 244 and applied at 246 to the signal being fed to the swinger arm 166. This voltage which will be a positive voltage will increase with increasing speed and tends to counteract the negative temperature error signal and produce the portion 247 of the curve of Fig. 4. As shown in Fig. 4 at about 33% R. P. M., the relay 64 will be actuated to ground out the swinger arm and return the control to normal control. In the event the relay does not operate, the rectified signal appearing at 246 will continue to counteract the temperature error signal coming in on line 27 and provide the portion 248 of the curve of Fig. 4. This will bring the curve so low in temperature that the normal rise of temperature in the turbine will produce a temperature falling above the line and transfer the control over to normal control.

If at any time during the starting cycle, while the fuel is being held at the minimum fuel flow, ignition takes place and the fuel becomes ignited, consequent rise in temperture in the tailpipe will be sufficient to bring the temperature above the curve in Fig. 4 which will so reduce the negative signal being fed in on line 27 and consequently the negative signal being fed in on line 224 to the swinger that it will become zero, so that the resulting signal in the proportional solenoid will be the same polarity as caused by an unmodified negative signal at the crossover input and call for maximum fuel which will be limted only by the temperature error or the speed error signals in the normal manner.

Although the circuit, including the starting circuit, has been described in detail and only a single embodiment has been used as an example in the description, it will be apparent that many modifications may be made which will come within the scope of the invention. Therefore, we do not desire to be limited by the details of the embodiment which has been selected for the purpose of explaining the invention.

For example, while particular polarities have been chosen and used in the embodiment described, it is apparent that the several polarities may be reversed without affecting the result. Also while the invention has been explained in connection with a structure utilizing a pair of error signals and a crossover limiter for selecting the proper error signal for control, the invention could be used in a structure in which only one error signal was utilized for control, in which case the crossover limiter could be dispensed with. For example, if temperature alone were used as the fuel control, allowing the speed to settle out at some balance point or perhaps be controlled by a variable pitch propeller, the starting circuit might operate on temperature alone without a crossover limiter.

In the operation of the starting circuit the turbine is rotated by any suitable means usually an outside source of power and the fuel and ignition turned on. The starting circuit will prevent the fuel valve from delivering more than the minimum quantity of fuel while the engine is being cranked. After ignition takes place and the temperature of the tailpipe rises above the values indicated by the curve of Fig. 4 or the speed increases beyond 33% R. P. M., the starting biasing signal applied to swinger 166 will be eliminated so that the speed and temperature error signals will take over control in the usual manner.

What it is desired to secure by Letters Patent is:

1. In a control for a combustion gas turbine having fuel feeding means including a throttle valve and means for igniting the fuel fed to the turbine, means for closing said valve to a fixed position during starting to limit the rate of fuel flow during starting before ignition to a predetermined fixed minimum and means for automatically controlling fuel flow at a variable higher rate by movement of said valve during normal operation of said turbine, and means responsive to a function of the turbine incident to ignition of the fuel for automatically changing from one rate to the other.

2. A device as claimed in claim 1 including means maintaining the fuel pressure drop across the throttle valve substantially constant.

3. In a combustion gas turbine having means establishing a fixed minimum flow fuel rate and a variable fuel rate controlled by selected turbine parameters, turbine starting means comprising means overriding control by said parameters and limiting the flow rate to the fixed minimum flow prior to ignition and means responsive to ignition of the fuel disabling said overriding means and automatically changing the limited fixed fuel rate to said variable fuel rate.

4. Combustion gas turbine starting mechanism including a rate selecting means for the fuel supply to said turbine, means automatically setting said selecting means to limit the rate of fuel flow to the turbine during starting and prior to ignition to a predetermined minimum, and temperature sensitive means effective in response to an increase in turbine temperature from below a predetermined value past said value to automatically reset said selecting means to an increased rate and automatically increase the rate of fuel flow from said predetermined minimum to the maximum permissible rate as the turbine temperature passes said value.

5. An electric starting circuit for a turbine engine having fuel supply mechanism comprising means for creating an under temperature error signal, means for applying said signal to said fuel supply mechanism for said turbine to increase the fuel flow thereto, means for modifying said signal during starting of the turbine to decrease the fuel flow thereto, and means responsive to an increase in temperature of said engine above a predetermined range during starting to automatically disable said modifying means.

6. In combination with an electronic circuit utilizing a signal produced by variations of an engine parameter from a preselected datum for controlling the flow of fuel to said turbine to return said parameter to said datum, a starting circuit for said turbine utilizing said signal and said electronic circuit, said starting circuit including means for reversing the effect of said signal on the flow of fuel.

7. In combination with a fuel control system for a gas turbine having, temperature responsive means for creating an electric signal, speed responsive means for creating an electric signal, means combining said signals with respective data to provide speed and temperature error signals of opposite polarity above and below their respective datum and in increasing value away from their respective datum, means for automatically selecting the signal of the greatest numerical value above said datum, or, if both error signals are below their respective datum, the smallest numerical value below its respective datum as the controlling signal for controlling fuel flow to said turbine, a starting circuit for said turbine comprising means comparing said temperature error signal with a fixed datum and a speed responsive signal to obtain a starting circuit signal responsive to temperature and varying inversely with speed, means combining said starting circuit signal with said speed and temperature signals to reverse the polarity of at least one of said last mentioned signals during starting.

8. A device as claimed in claim 7 including means responsive to an increase in temperature or speed above preselected values to automatically disable said starting circuit.

9. In an electric fuel control circuit, means for receiving a temperature responsive signal and producing an under temperature signal therefrom, means for converting said under temperature signal into an increase fuel signal, means for diverting a portion of said under temperature signal, means for modifying said diverted signal and means combining said modified diverted signal with said under temperature signal fed to said converting means to produce a decrease fuel signal.

10. A circuit as claimed in claim 9 including means for limiting the absolute value of said under temperature signal fed to said converting means.

11. In an electric circuit for controlling the flow of fuel to a fuel combustion device, means for receiving a temperature responsive signal from said combustion device, comparing said signal with a datum signal and producing an under temperature, an on temperature, or an over temperature, signal therefrom in response to a corresponding condition of said device, means for converting said under temperature signal to an increase fuel signal, means for diverting a portion of said under temperature signal, means for modifying said diverted signal and means combining said modified diverted signal with said under temperature signal to produce a decrease fuel signal when the temperature of said device is within a predetermined range.

12. In an electric circuit for controlling the flow of fuel to a gas turbine, means for receiving a temperature responsive signal from said turbine and producing an under temperature signal therefrom in response to a corresponding condition of said turbine, means for converting said under temperature signal into an increased fuel signal, means for diverting a portion of said under temperature signal, means for modifying said diverted signal and means connected with said modified diverted signal to produce a decrease fuel signal when the temperature and speed of said turbine are within predetermined ranges including means preventing said converting means from producing an increase fuel signal.

13. A circuit as claimed in claim 12 in which the modifying means includes means for modifying said diverted signal with a speed responsive signal from said turbine.

14. A circuit as claimed in claim 12 including means for limiting the value of said under temperature signal fed to said converting means and means for modifying said diverted signal by comparing it with a fixed datum and modifying the compared signal with a speed responsive signal from said turbine and in which the modified diverted signal is combined with the limited under temperature signal to produce a decrease fuel signal.

15. In an electric circuit for controlling the flow of fuel to a gas turbine, means for receiving a temperature responsive signal from said turbine, comparing said signal with a datum signal and producing an under temperature signal therefrom in response to a corresponding condition of said turbine, means for receiving speed responsive signals from said turbine comparing said speed responsive signals with a datum signal and producing an under speed signal therefrom in response to a corresponding condition of said turbine, means for converting the least under temperature or under speed signal into an increase fuel signal, means for limiting the value of said under temperature signal fed to said converting means, means for diverting a portion of said under temperature signal, means for comparing said diverted signal with a fixed datum and modifying said compared signal with a speed responsive signal from said turbine to provide a starting circuit signal varying as a function of speed and temperature and means combining said starting circuit signal with said limited under temperature signal to produce a decrease fuel signal during starting of the turbine while the turbine is below a predetermined speed and the temperature is below a predetermined range of temperatures.

16. A circuit as defined in claim 15 in which the means for limiting the under temperature signal comprises rectifier short circuiting signals above a selected value.

17. A circuit as claimed in claim 15 in which the speed responsive signal is produced by a generator driven by said turbine and the means for producing the starting circuit signal from the under temperature signal includes a rectifier connected with a constant voltage source to eliminate said signal at zero speed, a second rectifier connected with said generator and said first rectifier and opposing the voltage produced by the first rectifier to reduce the effect of said datum with increasing turbine speed and a voltage divider connected with a source of constant voltage and with said under temperature signal for attenuating said signal, a rectifier for shorting out signals of a polarity opposite to said under temperature signals and an additional rectifier connected to said generator and said signal for reducing said signal with increases in speed.

18. In a combustion gas turbine having continuously operable speed governing means including speed responsive means for increasing fuel flow in response to turbine speeds below a selected speed above starting speed and decreasing fuel flow in response to turbine speed above said selected speed, turbine starting mechanism including means for limiting the rate of fuel flow to a predetermined minimum during starting.

19. A device as claimed in claim 18 including means responsive to turbine speeds above a predetermined amount for disabling said limiting means and restoring control by said governing means.

20. In a starting control for a combustion gas turbine having fuel feeding means, a throttle valve and a control therefor controlling the flow of fuel to the turbine at all times, and means for igniting the fuel fed to the turbine, means, responsive to a selected engine parameter, actuating said throttle control to regulate the fuel flow to govern to said selected turbine parameter, starting means disabling control by said parameter and actuating said throttle control to close said throttle to a fixed position during starting to limit the rate of fuel flow to a predetermined minimum during starting, and means responsive to a function of the turbine incident to ignition of the fuel for changing from the minimum fuel flow to the regulated fuel flow.

21. Combustion gas turbine fuel control including a fuel valve and a valve control automatically positioning said valve independent of fuel pressure to limit the rate of fuel flow to the turbine to a predetermined minimum during starting, and means responsive to selected engine parameters controlling the rate of fuel flow by movement of said valve during normal running of said turbine, and means responsive to a function of the turbine incident to ignition of the fuel for automatically changing from one rate to the other.

22. A device as in claim 21 in which means are provided moving said valve toward closed position to a fixed position and holding said valve in said fixed position during starting.

23. In a starting control for a combustion gas turbine having fuel control means responsive to selected engine parameters for regulating fuel flow to said turbine while running, starting means connected with said control means and disabling control by said parameters and limiting the fuel flow to a predetermined minimum while starting, and means responsive to a function of the turbine incident to ignition of the fuel for automatically changing from the limited fuel flow to the regulated fuel flow.

References Cited in the file of this patent

UNITED STATES PATENTS

| 2,637,165 | Stockinger | May 5, 1953 |
| 2,683,965 | Nagely | July 20, 1954 |
| 2,741,086 | Machalanski | Apr. 10, 1956 |

FOREIGN PATENTS

| 591,565 | Great Britain | Aug. 21, 1947 |